E. S. HALL.
FIFTH WHEEL.
APPLICATION FILED DEC. 31, 1912.
1,105,424.
Patented July 28, 1914.
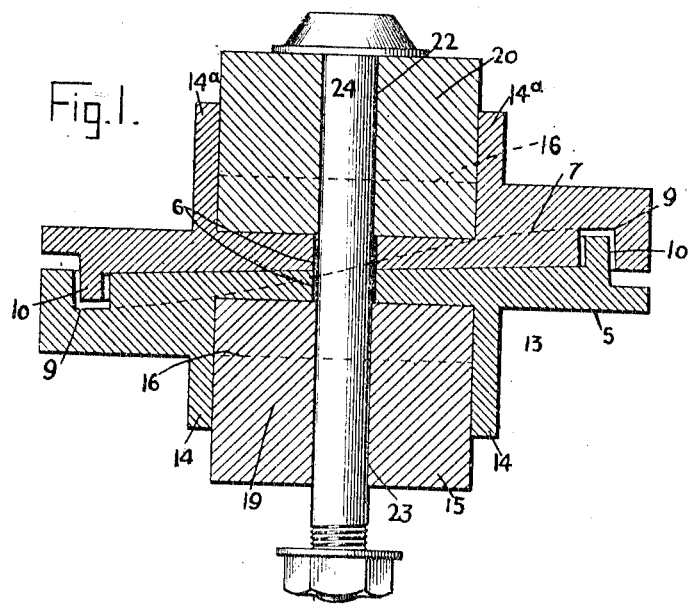
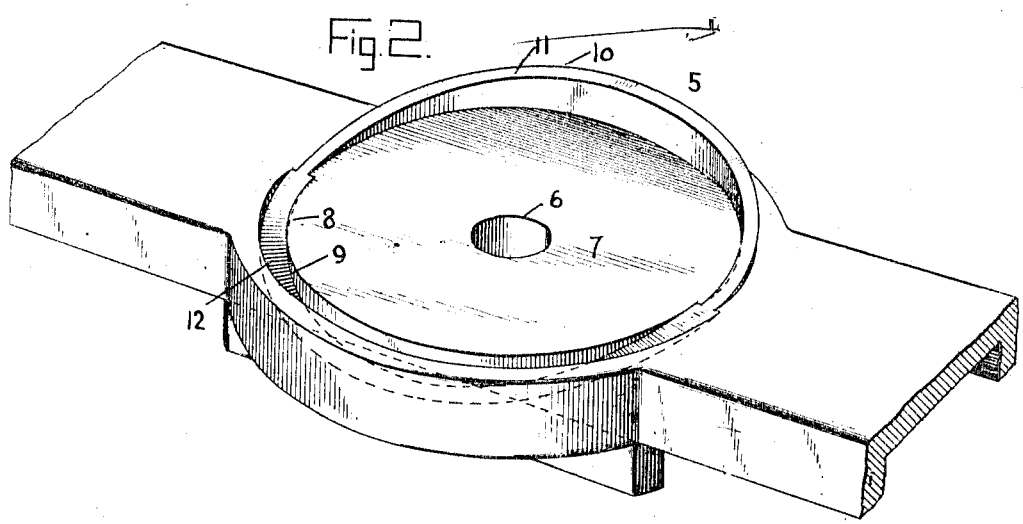
WITNESSES
C. K. Reichenbach.
E. B. Marshall
INVENTOR
EDGAR S. HALL,
BY Munn & Co.
ATTORNEYS

UNITED STATES PATENT OFFICE.

EDGAR SERENO HALL, OF BELFRY, MONTANA.

FIFTH-WHEEL.

1,105,424.     Specification of Letters Patent.     Patented July 28, 1914.

Application filed December 31, 1912. Serial No. 739,479.

*To all whom it may concern:*

Be it known that I, EDGAR SERENO HALL, a citizen of the United States, and a resident of Belfry, in the county of Carbon and State of Montana, have invented a new and Improved Fifth-Wheel, of which the following is a full, clear, and exact description.

My invention has for its object to provide a fifth wheel which will relieve the king bolt from undue strain, and which will give great stability and firmness between the wagon parts, when a wagon with my improvement is used on uneven roads, or where the load is very heavy.

Another object of the invention is to provide means for holding the tongue of the vehicle yieldingly in the plane of the longitudinal center line of the vehicle.

My fifth wheel gives a greater stability than is obtainable with other constructions when used on uneven roads, or where the center of gravity of the load is at a distance from the ground. In hilly and mountainous country great difficulty is experienced in moving bulky freight as baled hay and cotton, because to complete a load on a wagon it must be piled very high, which places the center of gravity at a considerable distance from the ground. When a wagon loaded in this way comes to a sharp turn in the road, where there are uneven wagon tracks, the wagon tracks cause the load to lurch, and using a wagon with a common form of bolster plate, the turning of the front wheels relatively to the front bolster leaves only a small bearing surface at the center to support and steady the load. With my fifth wheel the support is not lessened in any way, and the inclined faces, the flanges and the grooves in my construction serve to rotate the fifth wheel back to normal position.

Additional objects of my invention will appear in the following complete specification, in which the preferred form of the invention is disclosed.

In the drawings similar characters of reference indicate corresponding parts, in both the views, in which—

Figure 1 is a sectional elevation of my improvement; and Fig. 2 is a perspective view showing one of the fifth wheel members, with its ends cut away.

My fifth wheel is constructed with a member having an opening for a king bolt, and with an inclined surface having its outer margin concentric with the opening, there being at one side of the inclined surface a groove concentric with the opening, and at the other side a flange, which is also concentric with the opening, the flange having its upper surface forming a continuation of the bottom of the groove, so that the upper surface of the flange will form a guide member, which is a continuation of the guide member formed in the bottom of the groove. When the flange on the fifth wheel member is disposed in a groove in a similar and companion fifth wheel member, and a flange on the companion fifth wheel member is disposed in the groove in the first member, the engagement of the flanges with the grooves will relieve the king bolt of strain and shock, and will also serve to steady the parts, and will assist in holding the members in normal position relatively to each other.

It will be seen that as the fifth wheel members tend to hold the parts in normal position relatively to each other, they will tend to hold the tongue of the vehicle in normal position and extended in the plane of the longitudinal center line of the vehicle, and assist the draft animals in their work.

The fifth wheel members have recesses on their reverse sides, in which fit bolster members so that the fifth wheel members will be firmly held to the bolster members.

By referring to the drawings it will be seen that the fifth wheel member 5 is provided with a vertical opening 6 for the king bolt. The fifth wheel member has a face 7, disposed obliquely relatively to the axis of the king bolt opening 6, as best shown in Fig. 1 of the drawings. The margin 8 of this inclined face 7 is concentric with the opening 6. Adjacent the margin 8 of the inclined face 7 and at one side of the opening 6, and concentric therewith, there is a groove 9, there being a flange 10 at the other side of the opening 6, and concentric therewith, the surface 11 of this flange 10 forming a continuation of the bottom 12 of the groove. The flange 10 is inclined toward the axis of the fifth wheel member 5 and has considerable play in the groove 9 in a companion wheel member. The other face 13 of the fifth wheel member 5 has extending parallel flanges 14 between which may be disposed an axle member 15, the fifth wheel member 5 having ends 16, which engage the ends of the axle member 15, and assist in preventing dislodgment. It will, therefore, be seen that when two fifth wheel members 5 are constructed in the manner described, one of these fifth wheel members may be inverted, and may be disposed on the other, with its flange 10 disposed in the groove 9 in the companion fifth wheel member, and the flange 10 of the companion fifth wheel member disposed in the groove 9 of the inverted fifth wheel member, there being a bolster member 20 disposed between the parallel flange 14ᵃ of the inverted fifth wheel member 5.

Through the openings 6, and through openings 22 and 23 in the axle, or bolster members 20 and 15, there is disposed a king bolt 24.

It will be understood that when the two companion fifth wheel members are disposed in normal position, they will engage each other, as shown in Fig. 1 of the drawings, and as the inclined faces 7, the flanges 10 and the grooves 9 will act as cams the weight of the wagon and its load tending to rotate the upper fifth wheel member, so that it will move down to its normal position, shown in Fig. 1 of the drawings.

It will be understood that the movement of one of the fifth wheel members 5 is limited relatively to the other fifth wheel member 5 by the construction of the vehicle, and that at all times portions of the flanges 10 will be disposed in and will engage the grooves 9 to relieve the king bolt from excessive strain, wear and shock.

As shown in Fig. 1 of the drawings, the inclined faces 7 of the fifth wheel members normally engage each other, the friction of the faces against each other serving to hold the fifth wheel members in normal position, relatively to each other, and to prevent the jerking of the wagon pole.

It will be understood that the device may be constructed in any desired size, and that it may be used for all kinds of four wheeled vehicles, and also for all purposes where a pivoted member is subject to a strain at one side.

Having thus described my invention I claim as new and desire to secure by Letters Patent:

1. In an article of the class described, a member having an opening for a bolt, extending through one of its faces, and a groove in the face at one side of and concentric with the opening, and a flange on the face at the other side, and concentric with the opening, the member being adapted to be disposed with its flange and groove in engagement with a flange and groove on a similar member.

2. In an article of the class described, two companion members each having an opening for a bolt, extending through one of its faces, and a groove in the face at one side of and concentric with the opening, and a flange on the face at the other side and concentric with the opening, the members being normally disposed with the flanges engaging the companion members in the grooves.

3. In an article of the class described, two companion members each having an opening for a bolt, extending through one of its faces, and a groove in the face at one side of and concentric with the opening, a flange on the face at the other side and concentric with the opening, the flange having a surface which forms a continuation of the bottom of the groove, the companion members being disposed with the flanges engaging the grooves in companion members.

4. In an article of the class described, two companion members each having an opening for a bolt, extending through one of its faces, and a groove in the face at one side of and concentric with the opening, a flange on the face at the other side and concentric with the opening, the face of the member between the groove and the flange being disposed obliquely relatively to the axis of the opening, the companion members being disposed with the flanges engaging the companion members at the groove.

5. In an article of the class described, two companion members each having an opening for a bolt, extending through one of its faces, and a groove in the face at one side of and concentric with the opening, and a flange on the face at the other side and concentric with the opening, the members being normally disposed with the flanges engaging the companion members in the grooves, and flanges extending from the other faces of the members for embracing additional members.

6. In an article of the class described, two members one disposed over the other for rotating relatively to each other, there being a cam groove concentric with the axis of rotation at one side of each of the members, each of the cam grooves extending substantially 180°, and a cam at the other side of each of the members, each of the cams extending substantially 180°, the cams being normally seated in the cam grooves for holding one of the members yieldingly against rotary movement relatively to the other.

7. In a device of the character described, two members disposed for rotating one over the other, there being an elongated circular cam groove in one of the members, and an elongated circular cam on the other member seated in the cam groove for holding one of the members yieldingly against rotary movement relatively to the other, the cam groove and the cam each extending more than 170°.

In testimony whereof I have signed my name to this specification in the presence of two subscribing witnesses.

EDGAR SERENO HALL.

Witnesses:
CHARLOTTE DILWORTH,
HUBERT A. SIMMONS.